United States Patent [19]

Andreasson et al.

[11] Patent Number: 4,841,920

[45] Date of Patent: Jun. 27, 1989

[54] ARRANGEMENT IN AN AIR-COOLED I. C. ENGINE

[75] Inventors: Bo C. Andreasson, Göteborg; Sören N. Henriksson, Kållered; Lars-Olof Kärreman, Lerum, all of Sweden

[73] Assignee: Aktiebolaget Electrolux, Sweden

[21] Appl. No.: 23,539

[22] Filed: Mar. 9, 1987

[30] Foreign Application Priority Data

Mar. 14, 1986 [SE] Sweden ................................ 8601210

[51] Int. Cl.$^4$ ........................ B01D 45/14; B23D 57/02

[52] U.S. Cl. .................................. 123/41.66; 123/41.7

[58] Field of Search ............... 123/41.56, 41.65, 41.66, 123/41.7

[56] References Cited

U.S. PATENT DOCUMENTS

| | | | |
|---|---|---|---|
| 1,477,277 | 12/1923 | Milker | 123/41.66 |
| 2,091,948 | 9/1934 | Alfaro | 123/41.56 X |
| 2,302,298 | 11/1942 | Cox | 123/41.7 X |
| 3,155,082 | 11/1964 | Roorda et al. | 123/41.7 |
| 3,566,848 | 3/1971 | Dobbertin | 123/41.65 |
| 3,855,976 | 12/1974 | Notaras et al. | 123/41.7 X |
| 3,994,067 | 11/1976 | Hazzard et al. | 123/41.65 |
| 4,438,733 | 3/1984 | Sasaki | 123/41.65 |

*Primary Examiner*—Tony M. Argenbright
*Assistant Examiner*—Eric R. Carlberg
*Attorney, Agent, or Firm*—Alfred E. Miller

[57] ABSTRACT

A motor saw wherein combustion air is drawn via a port tangentially located at the fan wheel in the fan housing of the motor saw. The combustion air is taken from an air stream in circulation from an air inlet at the top surface of the motor saw body where the concentration of pollutants is low. Pollutants are separated by the centrifugal effect of the fan before the air gets into the port. The cooling capacity of the air stream is completed with further cooling air from a second inlet. The combustion air can be pre-heated in a heating loop.

9 Claims, 2 Drawing Sheets

FIG.2
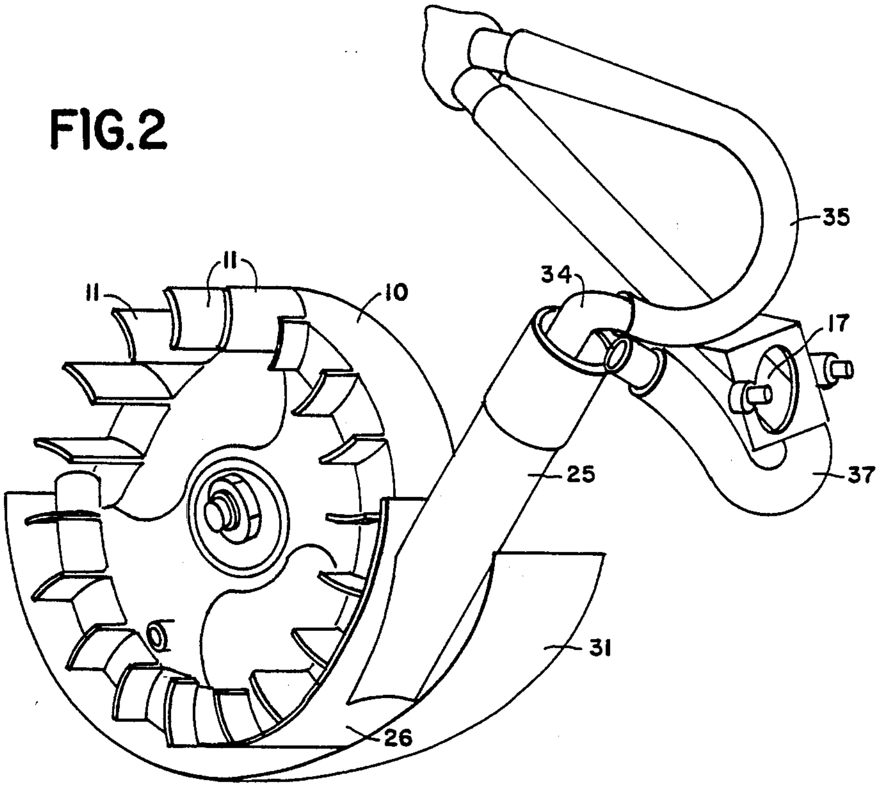
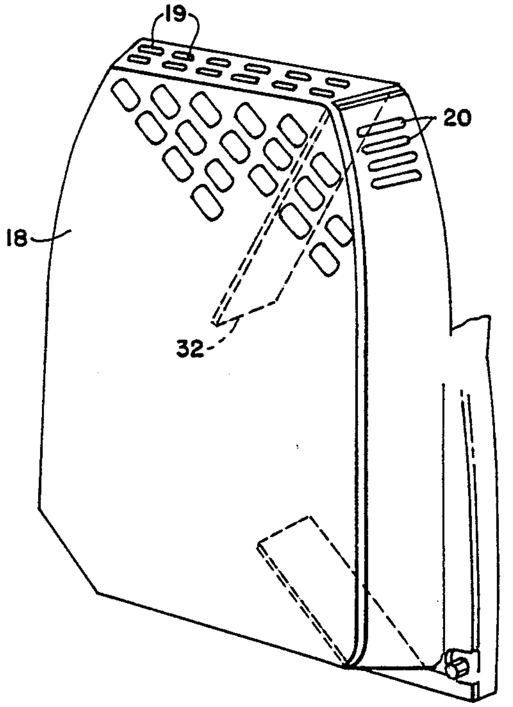
FIG.3

ARRANGEMENT IN AN AIR-COOLED I. C. ENGINE

The present invention relates to an arrangement for inlet of cooling and combustion air in a motor saw.

In previously known emnbodiments of motor saws the air inlet to the cooling fan of the saw is positioned in one side of the saw body near the ground, where the concentration of saw dust, oil smoke and sand and snow raked up from the ground during certain moments, is high. This will cause a pollution of the cooling fins of the cylinder which impairs the cooling and makes it necessary to clean the engine often, if problems with overheating are to be avoided.

In order to make an engine work well it is necessary, in winter time, to preheat the air to the carburator to decrease condensation of water in the crankcase and ice-formation in the nozzle of the carburator. It is thus known to use heated outlet air from the cooling system of the engine but there is a disadvantage in the form of pollutants which clogs the filter or admits a high degree of vapor of snow or water to moving parts, e.g. controls, which then get frozen fast therein.

The purpose of the present invention is to eliminate this disadvantages by providing an arrangement having more air inlets substantially in the top of the saw, where air is drawn from a range above the saw, where the concentration of pollutants is considerably lower than at the usually known inlet through the lower part of the fan cover. Due to the separation of the air stream in the fan house into cooling air and combustion air, respectively, to arrange a connection for the combustion air to the silencer of the engine in which the combustion air is heated before it comes to the carburator. The combustion air is separated from the air stream in the fan house by a special device which cleans the air. In Swedish patent specification No. 8403025-3 a pollution separator in a motor saw is described in which a channel conducts combustion air cleaned by the fan to the carburator. The present invention is an improvement of the arrangement described in said Patent Specification in that the air is taken to the fan through more inlets and distributed as cooling air and combustion air, respectively, by a system of guide plates.

An arrangement according to the invention will be described in the following reference to the accompanying drawing wherein:

FIG. 2 is a perspective view of the elements of the saw of FIG. 1 that are within the fan housing of the saw; and FIG. 3 is a perspective view of the shield of the saw of FIG. 1, with the internal components thereof.

Figure 1:
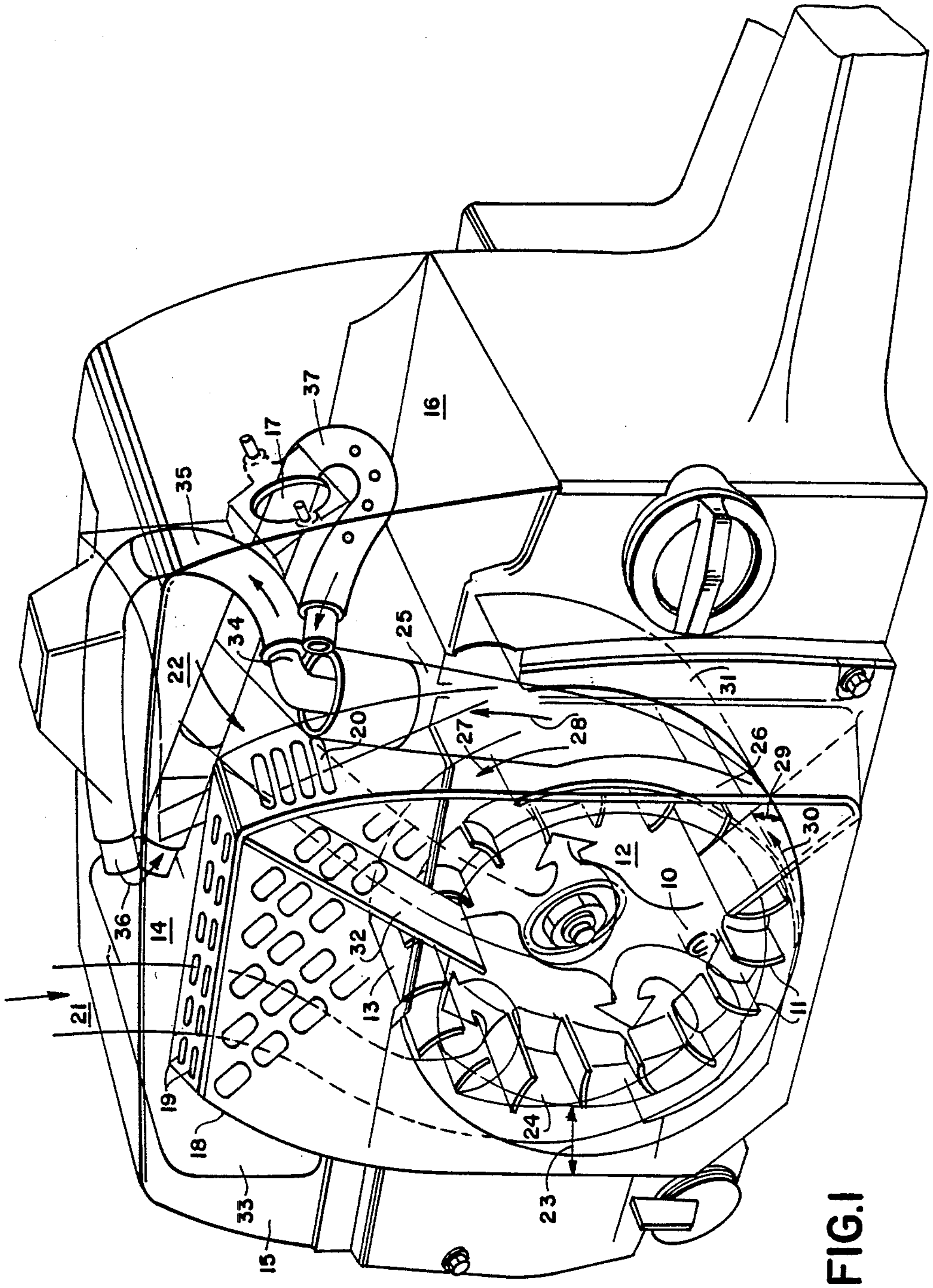
FIG. 1 is a perspective phantom view of a portion of a saw in accordance with the invention.

Referring now to FIGS. 1–3 motor saw with an air-cooled, one cylinder engine is shown in a view of the flywheel side. The flywheel 10 is in a usual way provided with fan wings 11 which during rotation forces an air stream out to the periphery of a fan house 12 and through i.a. an outlet 13 to an engine space 14 within a cover 15. At the side of the engine space is a carburator space 16 with a carburator 17. There are also an air filter, choke and gas controls belonging to the carburator. This is a conventional structure of a motor saw generally used in this art.

In the embodiment of the invention shown on the drawing a fan shield 18 is provided with two air inlets 19, 20, with air inlet streams 21, 22. The shield is an enlargement of the fan housing 12, so that an intermediate space 23 is created outside the intake opening 24 of the fan housing, where the streams 21, 22 pass into the housing. The carburator space communicates with the fan housing by the tube 25 which has a port at its lower end and a surrounding guide plate 26 which is bent along the periphery of the flywheel. The port is positioned outside the fan wings propelling an air stream 27 parallelly along the port wherefrom a stream 28 flows into the carburator space. At the lower end of the guide plate there is a spacing 29 between the plate and the wall of the fan housing in which an air stream 30 also passes by the guide plate and is deflected upwards by a guide surface 31 in the fan housing in the direction to the outlet 13. Pollution in the air which is thrown to the wall of the housing by the fan is mainly carried this way to the outlet and thus passed out of the fan housing.

The air stream 22 gets into the system along a guide rib 32 disposed in the fan shield and thus separating the two streams 21, 22. The latter (22) is wholly allotted to the engine space 14 and is a completion to the air stream 29 which alone, in unfavourable circumstances, has an insufficient cooling capacity. The air stream 22 gets into the fan housing after separation of the combustion air 28 at the port of the tube 25 and has thus nothing to do with the separation of pollution in the fan housing. Cooling air passing the engine leaves the engine space through aperture in the cover 15 on the opposite side of the saw.

A muffler 33 is also disposed in the engine space and is pervaded by hot combustion gases. A pre-heater of the combustion air is shown on top of the Figure and consists of a tube bend 34 and a hose 35 which conducts a part of the air stream 28 to a tube loop 36 in the muffler. The return conduit is constituted of a hose 37 which opens out at the tube 25 in the carburator room. Heated air from the pre-heater is here mixed with cooled air from the tube 25, whereby a tempered combustion air is obtained which prevents freezing in the carburator and controls. The conduit 35 can be provided with a damper with or without a thermostat.

What is claimed is:

1. In an air cooled internal combustion engine arrangement having a fan system, air inlets to the fan system, and a carburetor, the improvement wherein said air inlets comprise a first air inlet positioned to supply a first portion of the cooling air for the engine as well as substantially all of the combustion air to the engine, and a second air inlet separate from the first air inlet and positioned to supply the remainder of the cooling air for the engine, said arrangement further comprising a guide rib for separating the first and second inlets from one another, and a fan shield, said fan shield defining both of the inlets.

2. Arrangement according to claim 1, further comprising a fan housing, and wherein the air inlets are located in the upper portion of the fan shield in an extension of said fan housing.

3. Arrangement according to claim 2, wherein the fan shield is an enlargement of the fan housing and its inside constitutes an intermediate space at an intake opening of the fan housing.

4. Arrangement according to claim 3, wherein the guide rib is positioned axially outside the plane of the intake opening.

5. Arrangement according to claim 4, wherein a connecting conduit for air from the fan housing to a carburetor space is disposed in an opposite end of the fan housing in relation to said upper portion of the shield.

6. Arrangement according to claim 5, wherein the guide rib in the shield is positioned behind the connecting conduit with respect to the direction of rotation of the fan.

7. Arrangement according to claim 5, wherein the connecting conduit in the fan housing is surrounded by a guide plate extended in the direction of rotation of the fan and guiding an air stream substantially parallel to the part of the connecting conduit.

8. Arrangement according to claim 7, wherein one end of the guide plate forms a gap against the wall of the fan housing into which the fan, owing to centrifugal force, distributes pollutants in the air.

9. Arrangement according to claim 5, further comprising a muffler, and wherein the connecting conduit comprises debranching means passing through the muffler for pre-heating of the combustion air passing through said debranching.

* * * * *